United States Patent
Kumar et al.

(10) Patent No.: US 7,499,399 B2
(45) Date of Patent: Mar. 3, 2009

(54) METHOD AND SYSTEM TO DETERMINE WHETHER A CIRCULAR QUEUE IS EMPTY OR FULL

(75) Inventors: Alok Kumar, Santa Clara, CA (US); Uday R. Naik, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 974 days.

(21) Appl. No.: 10/735,146

(22) Filed: Dec. 12, 2003

(65) Prior Publication Data
US 2005/0129046 A1 Jun. 16, 2005

(51) Int. Cl.
*H04L 12/26* (2006.01)
(52) U.S. Cl. .................. 370/232; 370/412; 709/213
(58) Field of Classification Search .............. None
See application file for complete search history.

(56) References Cited

U.S. PATENT DOCUMENTS

| | | | | |
|---|---|---|---|---|
| 6,131,113 A * | 10/2000 | Ellsworth et al. | ........... | 709/213 |
| 6,134,217 A * | 10/2000 | Stiliadis et al. | ............. | 370/232 |
| 6,314,478 B1 * | 11/2001 | Etcheverry | ................. | 710/29 |
| 6,526,451 B2 * | 2/2003 | Kasper | .................... | 709/250 |
| 6,578,105 B2 * | 6/2003 | Finn et al. | ................. | 711/110 |
| 6,961,715 B1 * | 11/2005 | Li et al. | ................... | 705/52 |
| 7,113,516 B1 * | 9/2006 | Shefi et al. | .................. | 370/412 |
| 7,139,859 B2 * | 11/2006 | Dastidar et al. | ............. | 710/306 |
| 7,230,917 B1 * | 6/2007 | Fedorkow et al. | ........... | 370/229 |
| 7,272,672 B1 * | 9/2007 | Swenson et al. | .............. | 710/29 |

OTHER PUBLICATIONS

Intel, www.intel.com/design/network/products/npfamily/ixp2800.htm, "Intel IXP2800 Network Processor", Oct. 10, 2003.
Shreedhar, M. et al., "Efficient Fair Queuing Using Deficit Round Robin", Washington University in St. Louis, Nov. 18, 1994, pp. 1-26.
Intel, "OC-192 DRR Egress Scheduler", Intel IXA Software Building Blocks Developer's Manual, pp. 305-317.
"Weighted Random Early Detection on the Cisco 12000 Series Router", pp. 1-6.

* cited by examiner

*Primary Examiner*—Michael J Moore, Jr.
(74) *Attorney, Agent, or Firm*—Blakely, Sokoloff, Taylor & Zafman LLP

(57) ABSTRACT

A method and apparatus to determine whether a circular queue having N slots is empty or fill. A first queue element is dequeued from a current dequeue slot ("CDS") of the N slots designated by a CDS pointer. The CDS pointer is incremented to designate a new CDS. It is determined whether the circular queue is empty after the incrementing via executing a check comparing relative positions within the circular queue designated by the CDS pointer and a last enqueue slot ("LES") pointer. It is determined whether the circular queue is full after setting the LES pointer to designate a new enqueue slot of the circular queue into which a second queue element may be enqueued via re-executing the check.

23 Claims, 8 Drawing Sheets

```
enqueue( queue i)
{
        if (enqueue_count == dequeue_count)        // check #1
        {
                LES_i^N = CDS^N;                    // queue is empty
        }
        else if (((CDS^N - LES_i^N) mod N) < M)    // check #2
        {
                LES_i^N = CDS^N;                    // queue is empty and dequeue count is lagging
        }

LES_i^N = (LES_i^N + j) mod N;              // calculate where to enqueue the packet
                                                    // value j < M depends on queuing scheme
                                                    // Note: LES_i^N increases, CDS^N unchanged
        if (((CDS^N - LES_i^N) mod N) < M)         // check #3
        {
                Drop packet                         // queue has overflowed
                LES_i^N = (LES_i^N - j) mod N;      // reset LES_i to old value
        }
        else
        {
                Enqueue the packet
        }
} while (1)
{
        enqueue(i);                                 // call enqueue routine for queue i
                                                    // value LES_i may increase
        Perform some dequeues
        Perform enqueues on other queues
        CDS^N = (CDS^N + l) mod N;                  // l depends on how many rounds
                                                    // have completed dequeues
                                                    // Note: LES_i^N unchanged, CDS^N increases
}
```

FIG. 6

METHOD AND SYSTEM TO DETERMINE WHETHER A CIRCULAR QUEUE IS EMPTY OR FULL

TECHNICAL FIELD

This disclosure relates generally to circular queues, and in particular but not exclusively, relates to determining whether a circular queue is empty or full.

BACKGROUND INFORMATION

A packet flow entering a network is routed from one router to the next until the packet flow reaches its destination. At any given time, there may be many packet flows traversing the network between many different sources and destinations. To keep track of the packet flows, each router may establish a logical queue for each packet flow the router is forwarding. The logical queue is a logical construct established within software of the router to maintain order and keep track of the individual packets of each packet flow.

If the rate of packets arriving at a router along a flow exceeds the rate of packets departing the router along the flow, the packets are temporarily buffered in a queue within the router. Due to memory constraints, often the temporarily buffered packets are enqueued into a circular queue having a limited number of slots for buffering the packets. As each packet arrives at the router it is enqueued into an available slot of the circular queue following the last enqueued slot. As each packet departs the router it is dequeued thereby generating a new available slot. However, if the packet arrival rate is greater than the packet departure rate for an extended period of time, the circular queue can become full, resulting in an overflow condition where newly arriving packets overwrite pending packets that have not yet been dequeued for departure. Therefore it is critical to track and prevent overflow conditions.

Often, pointers are used to keep track of the last enqueued slot ("LES") and the current dequeue slot ("CDS"). As packets arrive and depart the circular queue, one or more LES pointers and a CDS pointer migrate along the circular queue until they reach the end of the circular queue. Once a pointer reaches the last slot of the circular queue, it wraps back to the first slot and continues therefrom.

Due to the wrapping nature of circular queues, it is important to determine whether a LES pointer has wrapped the circular queue and an overflow condition is imminently approaching or whether the CDS pointer has simply passed the LES pointer and the circular queue is empty. Thus, preventing overflow conditions requires careful monitoring of wrapping events.

Determining whether a circular queue is empty presents another issue. One method to determine whether a circular queue is empty is to maintain an enqueue count and a dequeue count for each logical queue buffered in a circular queue. Each time an packet arriving at the router along a packet flow is enqueued into the circular queue its enqueue count in incremented. Similarly, each time a packet from a logical queue is dequeued from the circular queue for departure, its dequeue count is incremented. Taking the difference between the enqueue count and the dequeue count can determine whether the particular logical queue buffered in the circular queue is empty.

However, maintaining accurate enqueue counts and dequeue counts can be difficult in high-speed networks, such as optical carrier ("OC") networks. If fact, in some high-speed networks, the writes to memory to update the dequeue count can lag behind the actual dequeue count by as many as 16 slots.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 illustrates pseudo-code for implementing three checks to determine whether logical queues buffered in a circular queue are empty or full, in accordance with an embodiment of the present invention.

DETAILED DESCRIPTION

Embodiments of a system and method for determining whether a circular queue is empty or full are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In ohter instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Packet flow" is defined herein as a flow of related packets, cells, frames, or otherwise, within a network and have a common source and destination.

In short, embodiments of the present invention provide techniques for determining whether a circular queue is empty or full (imminent overflow condition). In one embodiment, two checks are executed to determine whether the circular queue is empty and one check is executed to determine whether the circular queue is full. In one embodiment, the check for determining whether the circular queue is full is identical to one of the two checks for determining whether the circular queue is empty. In this embodiment, the two identical checks elude to the empty state or the full state of the circular queue based on the context in which the two identical checks are performed. In one context, the identical check is performed after enqueuing a queue element into the circular queue. In the other context, the identical check is performed after dequeuing a queue element from the circular queue. These and other embodiments are described in detail below.

Figure 1:
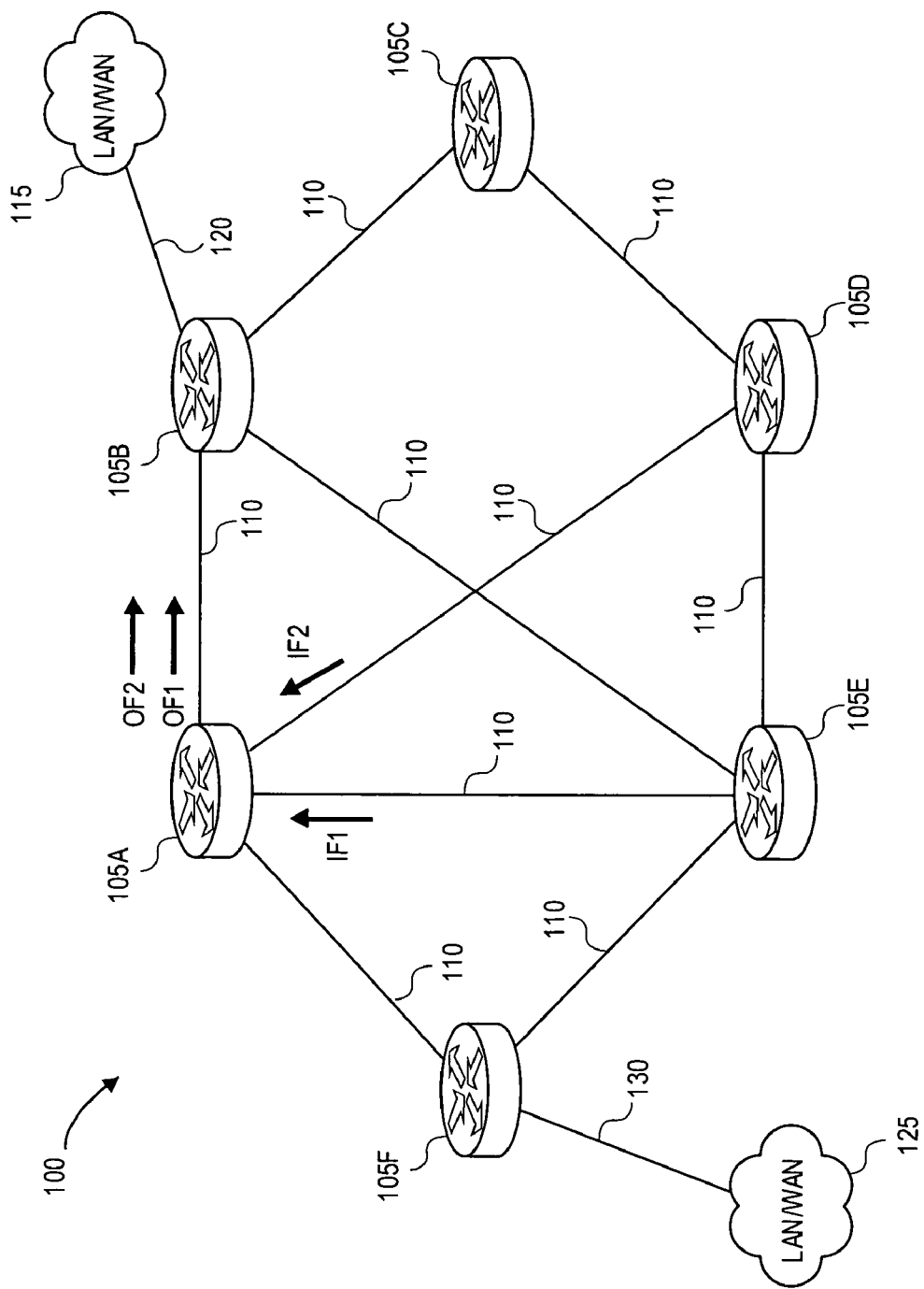
FIG. 1 is a diagram illustrating a network including routers for routing packet flows through the network, in accordance with an embodiment of the present invention.

FIG. 1 illustrates a network 100 including routers 105 interconnected by network links 110. Embodiments of network 100 may include any packet-switched network including wired or wireless, optical or electrical, local area network ("LAN"), wide area network ("WAN"), or the Internet. Routers 105 may also couple other LANs or WANs to network 100, such as network 115 coupled via network link 120 to router 105B and network 125 coupled via network link 130 to router 105F. Although network 100 is illustrated with five routers 105, it should be appreciated that network 100 may be scaled to include any number of routers coupled in various different patterns by more or less network links 110.

Routers 105 route packet flows through network 100 from a source to a destination. A packet flow may traverse several routers 10S before reaching its final destination. For example, router 105A is illustrated as routing two packet flows F1 and F2. Each packet flow traversing router 105A includes an inflow into router 105A and an outflow out of router 105A. As illustrated, packet flow F1 includes inflow IF1 and outflow OF1, and packet flow F2 includes inflow IF2 and outflow OF2. Inflows may arrive at router 105A on separate network links, such as inflows IF1 and IF2 or multiple packet flows may arrive at router 105 on a single network link. Similarly, outflows may depart router 105 on different network links or outflows may depart from router 105 on a single network link, such as outflows OF1 and OF2.

Figure 2:
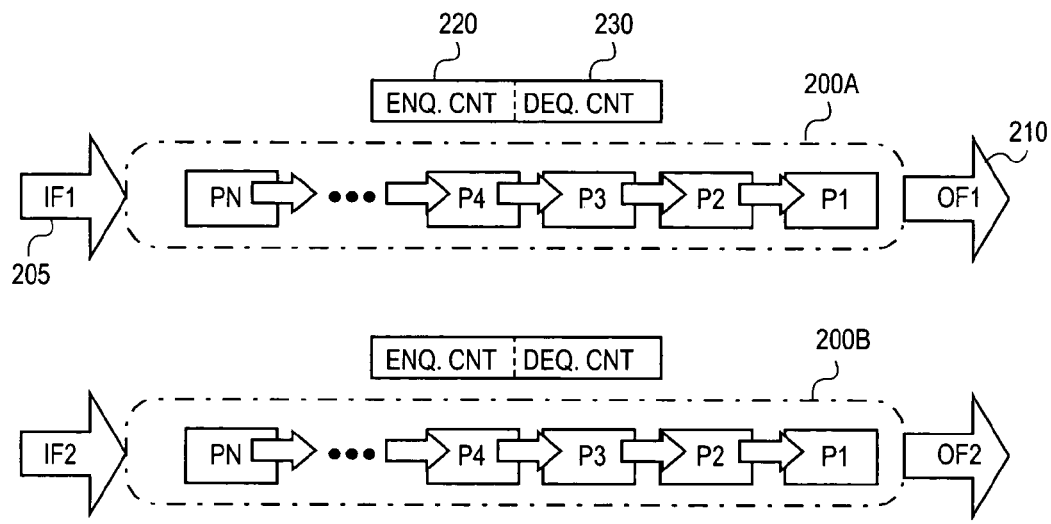
FIG. 2 is a block diagram illustrating two logical queues corresponding to two packet flows through a router, in accordance with an embodiment of the present invention.

FIG. 2 is a block diagram illustrating logical queues 200A and 200B corresponding to packet flows F1 and F2, respectively. Typically, logical queues 200 are conceptual constructs maintained in software executing on routers 105. Queue elements P1 through PN are logical constructs that represent individual packets of packet flows F1 and F2 which have been received by router 105A, but not yet forwarded along their respective outflows OF1 and OF2. Thus, logical queues 200 are logical constructs for router 105A to track packets queued within memory of router 105A and pending for transmission along a selected one of network links 110.

The operation of logical queues 200 are described in connection with logical queue 200A; however, logical queue 200B operates in a similar manner. Each time a packet is received by router 105A at inflow IF1, router 105A enqueues the packet at enqueue arrow 205 into logical queue 200A. For example, suppose packet P1 is the first packet received by router 105A from packet flow F1. Packet P1 is enqueued at enqueue arrow 205 into logical queue 200A and buffered therein until router 105A is ready to dequeue packet P1 at a dequeue arrow 210 for transmission along outflow OF 1. If packet P2 arrives along inflow IF1 prior to router 105A dequeuing packet P1, packet P2 is enqueued, added to logical queue 200A, and scheduled into logical queue 200A logically behind packet P1. If the arrival rate of packets along inflow IF1 is greater than the departure rate of packets along outflow OF1, then the number of pending packets within logical queue 200A will grow, until a maximum number is reached. In one embodiment, router 105A will commence statistical packet dropping according to a weighted random early detection ("WRED") as logical queue 200A approaches full capacity.

When router 105A is ready to dequeue packet P1, packet P1 is removed from logical queue 200A and transmitted along outflow OF1. Upon dequeuing packet P1 at dequeue arrow 210, the remaining pending packets shift forward making room for a new packet to be enqueued into logical queue 200A and packet P2 become the next packet to be dequeued for transmission along outflow OF1. Thus, in one embodiment, logical queue 200A is a first-in-first-out ("FIFO") logical queue.

To track the number of packets pending within logical queue 200A (and logical queue 200B), enqueue and dequeue counters are maintained. An enqueue counter 220 is incremented each time a packet is enqueued into logical queue 200A. Correspondingly, a dequeue counter 230 is incremented each time a packet is dequeued from logical queue 200A. Subtracting the dequeue count of dequeue counter 230 from the enqueue count of enqueue counter 220 gives the number of packets of flow F1 currently buffered within logical queue 200A.

Figure 3:
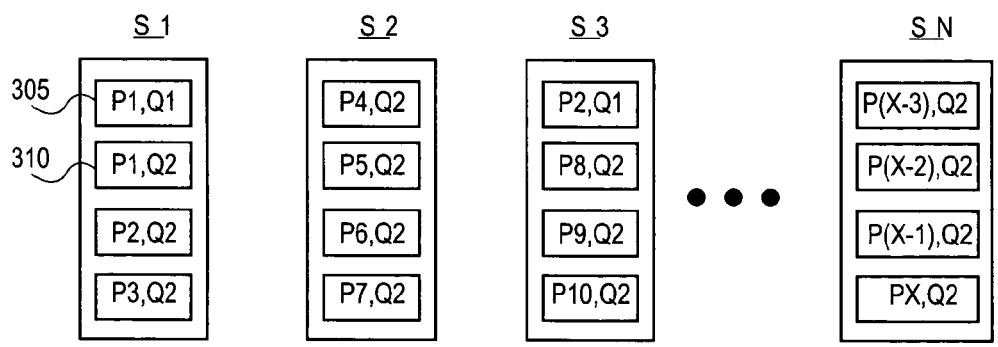
FIG. 3 is a block diagram illustrating a plurality of slots of a circular queue for queuing packets received from two packet flows, in accordance with an embodiment of the present invention.

FIG. 3 is a block diagram illustrating N slots (S1, S2, S3, . . . SN) of a circular queue 300, in accordance with an embodiment of the present invention. In one embodiment, circular queue 300 is a physical queue maintained in memory of router 105A to buffer queue elements associated with packets enqueued into logical queues 200A and 200B and scheduled for dequeue at a future time. For example, queue element 305 corresponds to packet P1 of logical queue 200A (which corresponds to packet flow F1), queue element 310 corresponds to packet P1 of logical queue 200B (which corresponds to packet flow F2), and so on. In one embodiment, the queue elements of circular queue 300 are pointers to locations within memory of router 105A containing the actual data packets. In an alternative embodiment, the queue elements are the actual packets or cells themselves.

The illustrated embodiment of circular queue 300 buffers queue elements corresponding to both logical queues 200A and 200B. However, embodiments of the present invention include circular queues that buffer queue elements from only a single logical queue (i.e., a single packet flow) or from a plurality of logical queues. The queue elements of circular queue 300 may be enqueued into circular queue 300 using various different enqueuing schemes. Similarly, the queue elements of circular queue 300 may be dequeued using various different dequeue schemes. Therefore, embodiments of the present invention are not limited to the particular enqueuing and dequeuing schemes implemented in connection therewith.

In one embodiment, a pre-sort deficit round robin ("DRR") queuing scheme may be implemented to determine the order of the queue elements pending within circular queue 300. Under the pre-sort DRR queuing scheme, ordering of the queue elements into circular queue 300 is dependent upon a number of factors including, arrival time of a packet along packet flows F1 and F2, the size of each packet, a DRR quantum, an accumulated deficit for each logical queue 200A and 200B, and a relative priority or weight given to each logical queue 200A and 200B. An intimate understanding of the pre-sort DRR queuing scheme is not necessary to understanding embodiments of the present invention. It is sufficient to say that the queue elements corresponding to logical queues 200A and 200B are efficiently organized into slots S1 through SN according to the pre-sort DRR queuing scheme to ensure fairness is maintained between packet flow F1 and F2. In other words, throughput bandwidth of router 105A is equitably shared between packet flows F1 and F2.

Figure 4:
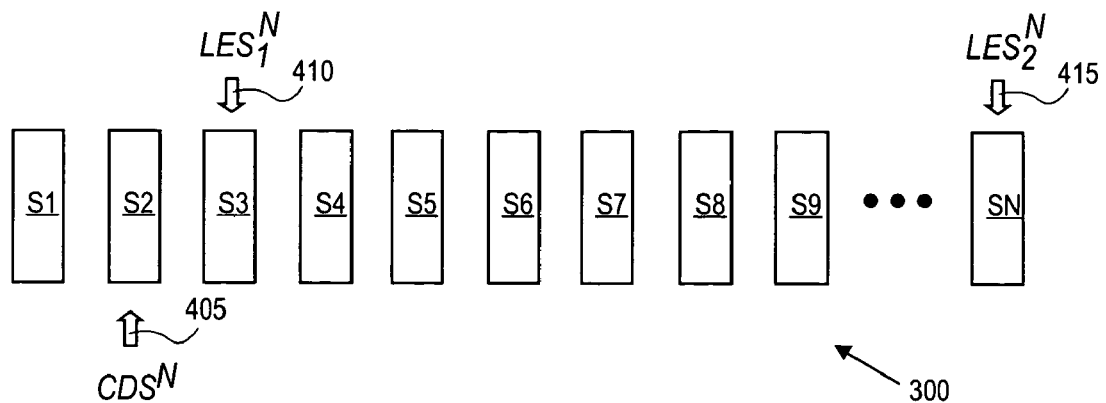
FIG. 4 is a block diagram illustrating a plurality of slots of a circular queue including a current dequeue slot ("CDS") and two last enqueue slots ("LES") each corresponding to a logical queue, in accordance with an embodiment of the present invention.

FIG. 4 is a block diagram illustrating circular queue 300 along with a current dequeue slot ("CDS") pointer 405 and last enqueue slot ("LES") pointers 410 and 415, in accordance with an embodiment of the present invention. CDS pointer 405 designates the CDS, which is currently slot S2. LES pointer 410 designates the LES corresponding to logical queue 200A, which is currently slot S3. LES pointer 415 designates the LES for logical queue 200B, which is currently slot SN.

As can been seen from FIG. 4, both logical queues 200A and 200B share a common CDS, but there is one LES per logical queue. A CDS is the slot of circular queue 300 from which queue elements are currently being dequeued by router 105A. Referring to FIGS. 3 and 4, since CDS pointer 405 is designating slot S2 as the CDS, router 105A is currently dequeuing queue elements P4 through P7 of logical queue 200B.

In contrast, a LES is the current slot to which a logical queue (e.g., logical queue 200A or 200B) is enqueuing a queue element. Since, in the illustrated embodiment there are two logical queues 200A and 200B, two corresponding LES pointers 410 and 415 designate two LESs. LES pointer 410 designates slot S3, indicating that the last queue element of logical queue 200A to be enqueued was queue element P2 in slot S3. Similarly, LES pointer 415 designates slot SN, indicating that the last queue element of logical queue 200B to be enqueued was queue element PX in slot SN. Depending upon the situation, it is possible that LES pointer 410 and LES pointer 415 could designate the same slot at a given instant.

As queue elements corresponding to logical queue 200A and 200B are enqueued into circular queue 300, LES pointers 410 and 415 will advance from one slot to the next dependent upon the particular enqueuing scheme being implemented (e.g., pre-sort DRR) and the size of the packets arriving along their respective inflows IF1 and IF2. Similarly, as router 105A dequeues the queue elements from circular queue 300 in preparation of transmitting packets along outflows OF1 and OF2, CDS pointer 405 will advance from one slot to the next. While CDS pointer 405 will increment one slot at a time, LES pointer 410 and 415 may skip slots, if it is determined that the particular logical queues 200A and 200B have not accumulated sufficient credit to enqueue a queue element to a given slot. Thus, LES pointers 410 and 415 are specific to each packet flow F1 and F2 while CDS pointer 405 is a global pointer for all packet flows.

Figure 5:
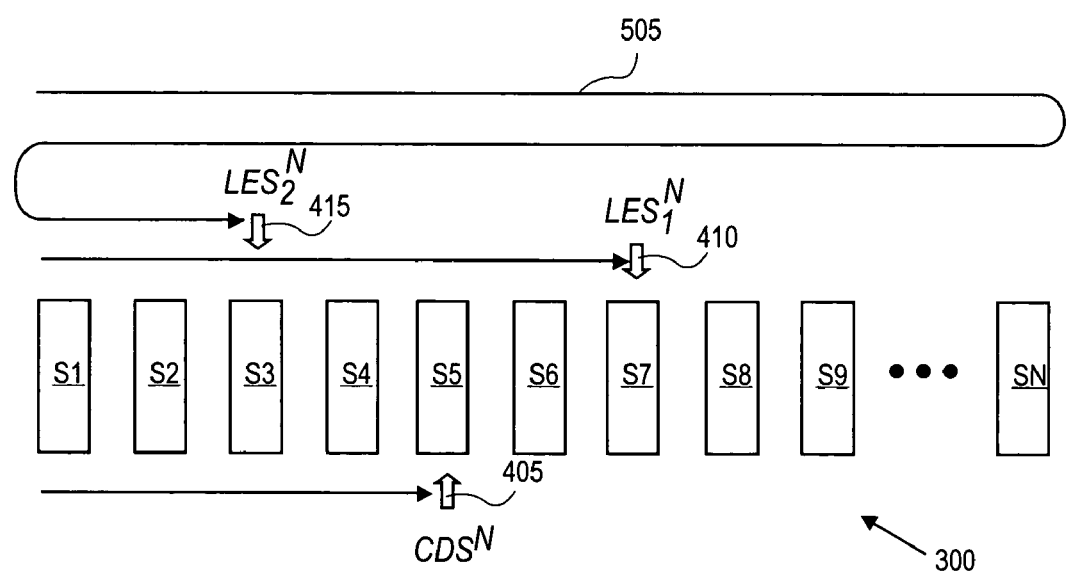
FIG. 5 is a block diagram illustrating how a LES pointer can wrap around in a circular queue, in accordance with an embodiment of the present invention.

FIG. 5 is a block diagram illustrating how CDS pointer 405 and LES pointers 410 and 415 wrap around circular queue 300, in accordance with an embodiment of the present invention. As each of CDS pointer 405 and LES pointers 410 and 415 advance to slot SN, the pointers wrap back to slot S1. Typical routers do not track the number of times CDS pointer 405 and LES pointers 410 and 415 wrap around circular queue 300. Therefore, the superscript N in $CDS^N$ and $LES^N$ indicates that CDS pointer 405 and LES pointers 410 and 415 are not monotonically increasing values, but rather values that range from 1 to N.

In FIG. 5, CDS pointer 405 is illustrated as currently positioned ahead of LES pointer 415 and behind LES pointer 410. In order to know whether logical queue 200B is empty or imminently approaching an overflow condition, it is important to determine whether LES pointer 415 has fallen behind CDS 405 or has wrapped circular queue 300 and advancing on CDS pointer 405. If CDS pointer 405 has simply passed up LES pointer 415, then logical queue 200B is empty. In this case the last queue element corresponding to logical queue 200B was enqueued into slot S3, since LES pointer 415 designates slot S3. Therefore, router 105A would have dequeued the last enqueued queue element of logical queue 200B in slot S3. However, if LES pointer 415 has wrapped circular queue 300, as illustrated by line 505, then circular queue 300 is in danger of an overflow condition should LES 415 pass CDS pointer 405.

As mentioned above, router 105A may not track whether CDS pointer 405 and LES pointers 410 and 415 have wrapped circular queue 300, since the only information available to router 105A is $CDS^N$ and $LES^N$. Therefore, embodiments of the present invention use three checks that are repeatedly executed at specific times to determine whether logical queues 200A and 200B are empty or full. FIG. 6 illustrates pseudo-code 600 to implement these three checks. In the illustrated embodiment, pseudo-code 600 includes a while loop 605 that invokes an enqueue routine 610. Queue elements are dequeued from circular queue 300 within while loop 605 and enqueued to circular queue 300 within enqueue routine 610.

Figure 7:
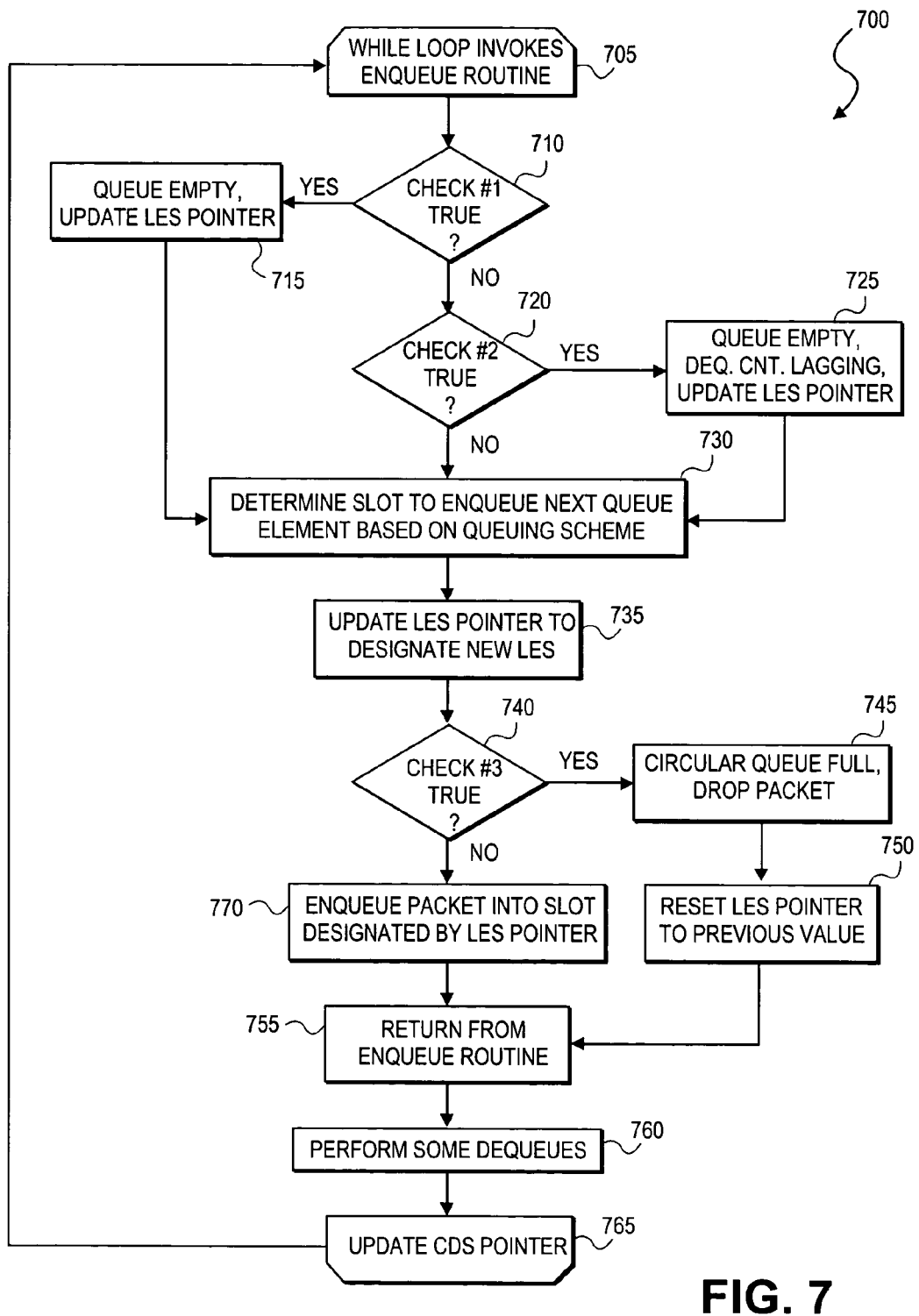
FIG. 7 is a flow chart illustrating a process 700 of executing pseudo-code for implementing three checks to determine whether logical queues buffered in a circular queue are empty or full, in accordance with an embodiment of the present invention.

FIG. 7 is a flow chart depicting a process 700 that graphically illustrates pseudo-code 600 for determining whether logical queues 200A and 200B of circular queue 300 are empty or full, in accordance with an embodiment of the present invention. In a process block 705, while loop 605 invokes enqueue routine 610 for logical queue(i) of circular queue 300. Logical queue(i) represents either one of logical queues 200A and 200B. As discussed above, it should be appreciated that any number of logical queues may be buffered within a single circular queue, including just one.

Figure 8:
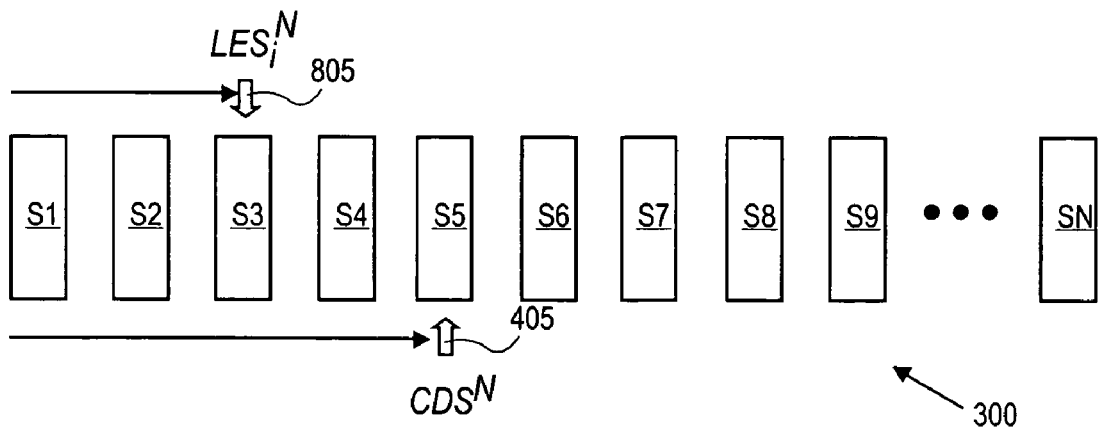
FIG. 8 is a block diagram illustrating a first check to determine whether a logical queue buffered in a circular queue is empty, in accordance with an embodiment of the present invention.

In a decision block 710, a check #1 is executed to determine whether logical queue(i) is empty. FIG. 8 is a block diagram illustrating check #1, in accordance with an embodiment of the present invention. FIG. 8 illustrates circular queue 300 including CDS pointer 405 and a LES pointer(i) 805. LES pointer(i) 805 corresponds to LES pointers 410 and 415, dependent upon the value of (i). LES pointer(i) 805 is a convenient notation to collectively refer to a selected one of LES pointers 410 and 415.

Check #1 determines whether the enqueue count of logical queue(i) is equivalent to the dequeue count of logical queue (i). The enqueue count and the dequeue count are maintained by an enqueue counter and a dequeue counter, such as enqueue counter 220 and dequeue counter 230, illustrated in FIG. 2. If the number of enqueued queue elements corresponding to logical queue(i) is equal to the number of dequeued queue elements of logical queue(i), then no queue elements of logical queue(i) remain pending within circular queue 300 and therefore logical queue(i) must be empty.

In this scenario where logical queue(i) is empty, process 700 continues to a process block 715. In process block 715, LES pointer(i) 805 is updated to designate the same slot as CDS pointer 405 (e.g., slot S5). FIG. 8 illustrates CDS pointer 405 as currently ahead of LES pointer(i) 805. CDS pointer 405 can pass up LES pointer(i) 805 if slots S4 and S5 in FIG. 8 were entirely enqueued with queue elements from a different logical queue. For example, if enqueue routine 610 was invoked for logical queue 200A, then CDS pointer 405 could pass LES pointer 410 if slots S4 and S5 were entirely enqueued with queue elements from logical queue 200B.

Returning to FIG. 7, if check #1 is false, process 700 continues to a decision block 720. If check #1 is false, logical queue(i) may still be empty. Each time a queue element is dequeued, the dequeue counter corresponding to logical queue(i) is incremented. However, there can be a delay between the time the queue element is dequeued and the dequeue counter is updated. In high-speed optical networks, this delay can be equivalent to the time it takes to dequeue 16 slots. Thus, although the enqueue count may not equal the dequeue count for logical queue(i), logical queue(i) may still be empty if the dequeue counter is lagging CDS pointer 405.

Figure 9:
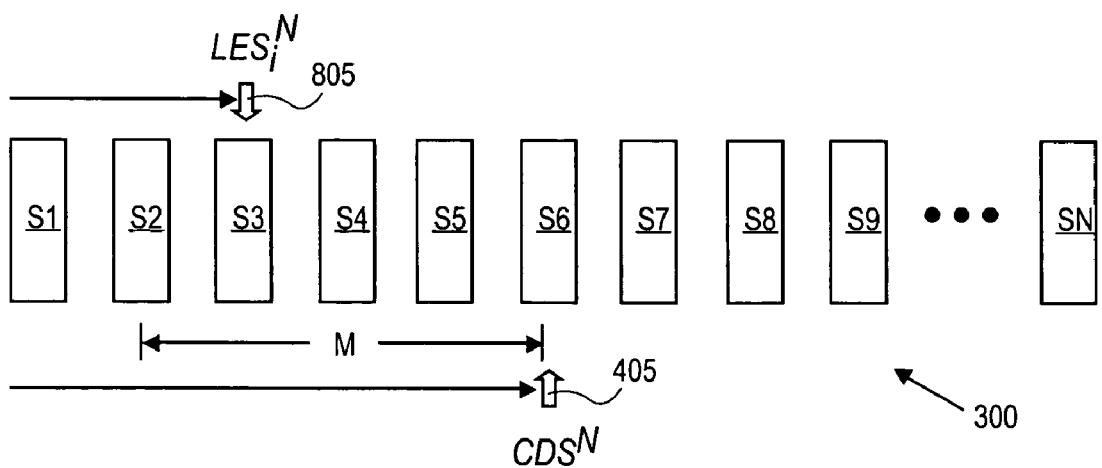
FIG. 9 is a block diagram illustrating a second check to determine whether a logical queue buffered in a circular queue is empty, in accordance with an embodiment of the present invention.

In decision block 720, a check #2 is executed to determine whether logical queue(i) is empty, notwithstanding a lagging dequeue counter. FIG. 9 is a block diagram illustrating check #2, in accordance with an embodiment of the present invention. Check #2 assumes a delay to update the dequeue counter. Check #2 is true if $((CDS^N - LES^N) \mod N)$ is less than M. In other words, if LES pointer(i) 805 is less than M slots behind CDS pointer 405, check #2 is true. M is selected to be equal to or greater than the maximum number of slots that can be dequeued before dequeue counter is updated. In the illustrated embodiment of FIG. 9, M=4. In general, M<<N. For example, where N=4096, M may range between 2 and 16, though M could be any number less than N.

Check #2 is effective at the boundaries of circular queue 300, as well. For example, in a scenario where M=4, LES pointer(i) 805 designates slot SN, and CDS pointer 405 designates slot S2, check #2 would be true since $(CDS^N - LES^N) \mod N$ would equal 2, which is less than M=4. Thus, check #2 accounts for the wrapping boundary conditions.

If check #2 is true, then logical queue(i) is empty and the dequeue counter is lagging. In this case, process 700 continues to a process block 725. In process block 725, since logical queue(i) has been determined to be empty, LES pointer(i) 805 is updated to designate the same slot as CDR pointer 405.

In a process block 730, router 105A determines the next slot into which the next packet received corresponding to logical queue(i) may be enqueued. This determination is based upon the particular scheduling scheme implemented by router 105A, such as pre-sort DRR queuing. In a process block 735, LES pointer(i) 805 is updated to designate the slot determined in process block 730. Thus, this next slot becomes a new LES, even though a queue element has not yet been enqueued into the new LES.

Figure 10:
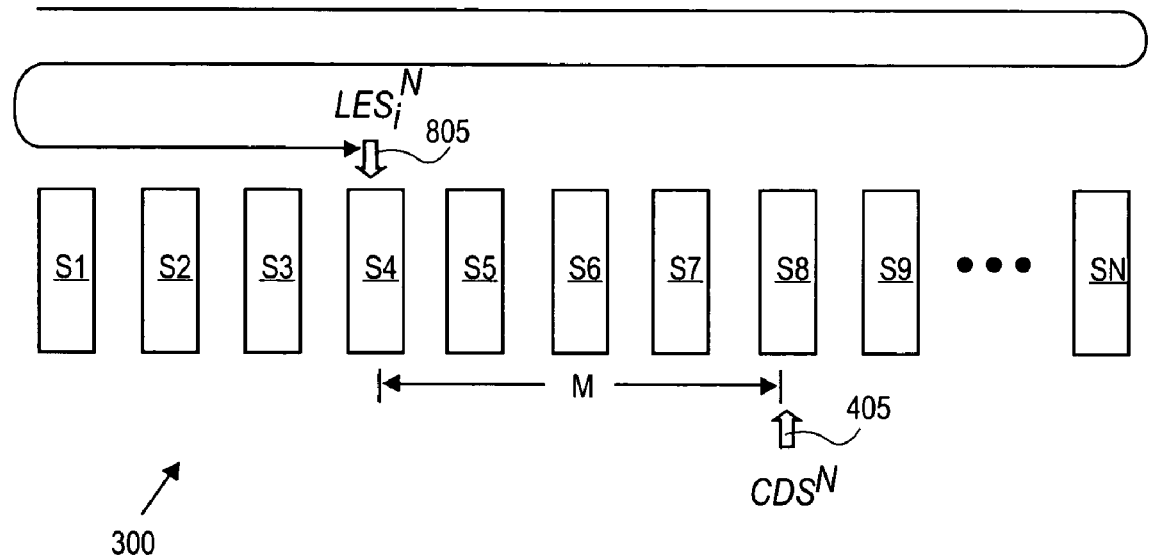
FIG. 10 is a block diagram illustrating a third check to determine whether enqueuing a queue element into a circular queue will result in an overflow condition, in accordance with an embodiment of the present invention.

In a decision block 740, a check #3 is executed to determine whether enqueuing the received packet into the new LES designated by LES pointer(i) 805 would cause an overflow condition. FIG. 10 is a block diagram illustrating check #3, in accordance with an embodiment of the present invention. It should be appreciated that check #3 is identical to check #2. However, it is the different contexts in which check #2 and check #3 are executed that makes the meaning of check #3 different from check #2.

Check #3 is executed after checks #1 and #2, which determine whether the logical queue(i) of circular queue 300 is empty. If the logical queue(i) was empty, then LES pointer(i) 805 would have been updated to reference the same slot as CDS pointer 405. The only possible intervening event since check #2 was increasing LES pointer(i) 805 to find the correct position for enqueuing the new queue element into circular queue 300. Thus, if LES pointer(i) 805 is less than M slots behind CDS pointer 405 at decision block 740, then logical queue(i) of circular queue 300 must be full.

Therefore, in a process block 745 the new queue element is dropped since enqueuing the new queue element would result in an overflow condition. In a process block 750, the LES pointer(i) 805 is reset to designate its previous value to reflect the fact that the new queue element was not enqueued in the anticipated slot. Rather the LES(i) remains the previous slot designated by LES pointer(i) 805.

In a process block 755, enqueue routine 610 returns to while loop 605. In a process block 760, router 105A performs one or more dequeues. In a process block 765, CDS pointer 405 is incremented by the number of slots dequeued in process block 760. At this point, process 700 loops back to the top of while loop 605 wherein enqueue routine 610 is called again in process block 705.

Returning to decision block 740, if check #3 proves to be false, logical queue(i) of circular queue 300 is not full. In this scenario, process 700 continues to a process block 770. In process block 770, the new queue element is enqueued into the new slot of circular queue 300 designated by the current value of LES pointer(i) 805. After process block 770, process 700 continues as described above from process block 755.

Upon running through process 700 a subsequent time, the outcome of check #2 will have a different meaning than check #3 because of its changing context. The only possible intervening event affecting the values of LES pointer(i) 805 or CDS pointer 405 between executing check #3 and a second execution of check #2 is incrementing CDS pointer 405 in process block 765. Thus, between the first execution of check #3 and the second execution of check #2, logical queue(i) could only have become empty from dequeuing one or more queue elements in process block 760. Put another way, logical queue(i) could not have become full, since queue elements are enqueued at process block 770 into circular queue 300 only if circular queue 300 is determined not full in decision block 740. Thus, if check #2 is true the second time through process 700, then logical queue(i) of circular queue 300 must be empty due to CDS pointer 400 passing LES pointer(i) 805. In contrast, upon executing check #3 for a second time, the only possible intervening event affecting the values of LES pointer (i) 805 or CDS pointer 405 is increasing LES pointer(i) 805 in process block 735. Since no queue elements are dequeued between check #2 and check #3, if check #3 is determined to be true, then logical queue(i) of circular queue 300 must be full because LES pointer(i) 805 has wrapped circular queue 300.

In order for process 700 to properly distinguish between a full logical queue buffered within circular queue 300 and an empty logical queue buffered within circular queue 300, a number of properties should hold true. Property #1 states that, if logical queue(i) is empty, then the enqueue count should equal the dequeue count after M slots have been dequeued. Thus, M should be selected to be equal to or greater than the maximum number of slots that can be dequeued before dequeue counter is updated. Property #1 accounts for a lagging dequeue counter.

A property #2 states that, two consecutive queue elements corresponding to logical queue(i), cannot be enqueued into circular queue 300 more than or equal to M rounds apart, unless logical queue(i) became empty in between. In other words, when scheduling a queue element to be enqueued into circular queue 300, LES pointer(i) 805 should not increase M or more slots. If LES pointer(i) 805 can increase more than M slots in a single pass through process 700, then it is possible for circular queue 300 to overflow without notice. This overflow condition would be possible because LES pointer(i) 805 could jump over the M slots behind CDS pointer 405, thereby failing to trigger a true result for check #3. Thus, to ensure property #2 is maintained, M should be selected based on a maximum transmission unit ("MTU") of network 100 and the smallest quantum of the scheduling scheme executed, such that at least one queue element can be enqueued into circular queue 300 every M slots.

A property #3 states that, if ENQ.CNT.!=DEQ.CNT. (check #1 is false) and CDS≦LES(i)≦CDS+N−M, which is the normal state of operation where circular queue 300 is neither full nor empty, then $(CDS^N-LES^N(i))\mod N < M$ (check #2 and #3) is always false. The following is a proof of property #3:

CDS≦$LES_i$≦CDS+N−M
⇒0≦($LES_i$−CDS)≦N−M.
Taking (mod N) will leave all values unchanged as they are between 0 to (N−1)
⇒0≦($LES_1$−CDS)mod N≦(N−M)mod N.
⇒0≦(($LES_1$ mod N)(CDS mod N))mod N≦(N−M).
Because (x−y)mod z=((x mod z)−(y mod z))mod z.
⇒N−0≧N−($LES_i^N$−$CDS^N$)mod N≧M.
⇒0≦($LES_i^N$−$CDS^N$)mod N≦(N−M)
⇒N≧($CDS^N$−$LES_i^N$)mod N≧M.
⇒($CDS^N$−$LES_i^N$)mod N≦M
⇒($CDS^N$−$LES_i^N$)mod N<M is always false A Property #4 states that, if ENQ.CNT.!=DEQ.CNT. (check #1 is false) and CDS>LES(i)>CDS−M, then logical queue(i) of circular queue 300 is empty and $(CDS^N-LES^N(i))\mod N < M$ (check #2 and check #3) is always true. The following is a proof of property #4:

CDS>$LES_i$>CDS−M
⇒CDS−$LES_i$>0 and CDS−$LES_i$<M.
Taking (mod N) will leave all values unchanged as they are between 0 to (N−1)
⇒0<(CDS−$LES_i$)mod N≦(M)mod N.
⇒0<($CDS^N$−$LES_i^N$)mod N<M.
⇒($CDS^N$−$LES_i^N$)mod N<M is always true A property #5 states that, if ENQ.CNT.!=DEQ.CNT. (check #1 is false) and CDS+N>LES(i)>CDS+N−M, logical queue(i) is full and $(CDS^N-LES^N(i))\mod N < M$ (check #2 and check #3) is always true. The following is a proof of property #5:

CDS+N>$LES_i$>CDS+N−M
⇒N>($LES_i$−CDS)>N−M.
Taking (mod N) will leave all values except LHS (left hand side) unchanged as they are between 0 to (N−1). Therefore we take mod of all expressions except LHS.
⇒N>($LES_1$−CDS)mod N≦(N−M)mod N.
⇒N>($LES_i^N$−$CDS^N$)mod N>(N−M).
⇒N−N<N−($LES_i^N$−$CDS^N$)mod N<M.
⇒0<($CDS^N$−$LES_i^N$)mod N<M.
⇒($CDS^N$−$LES_i^N$)mod N<M is always true.

The above properties prove that check #2 and check #3 in combination with check #1 correctly identify whether a queue is empty or full.

Figure 11:
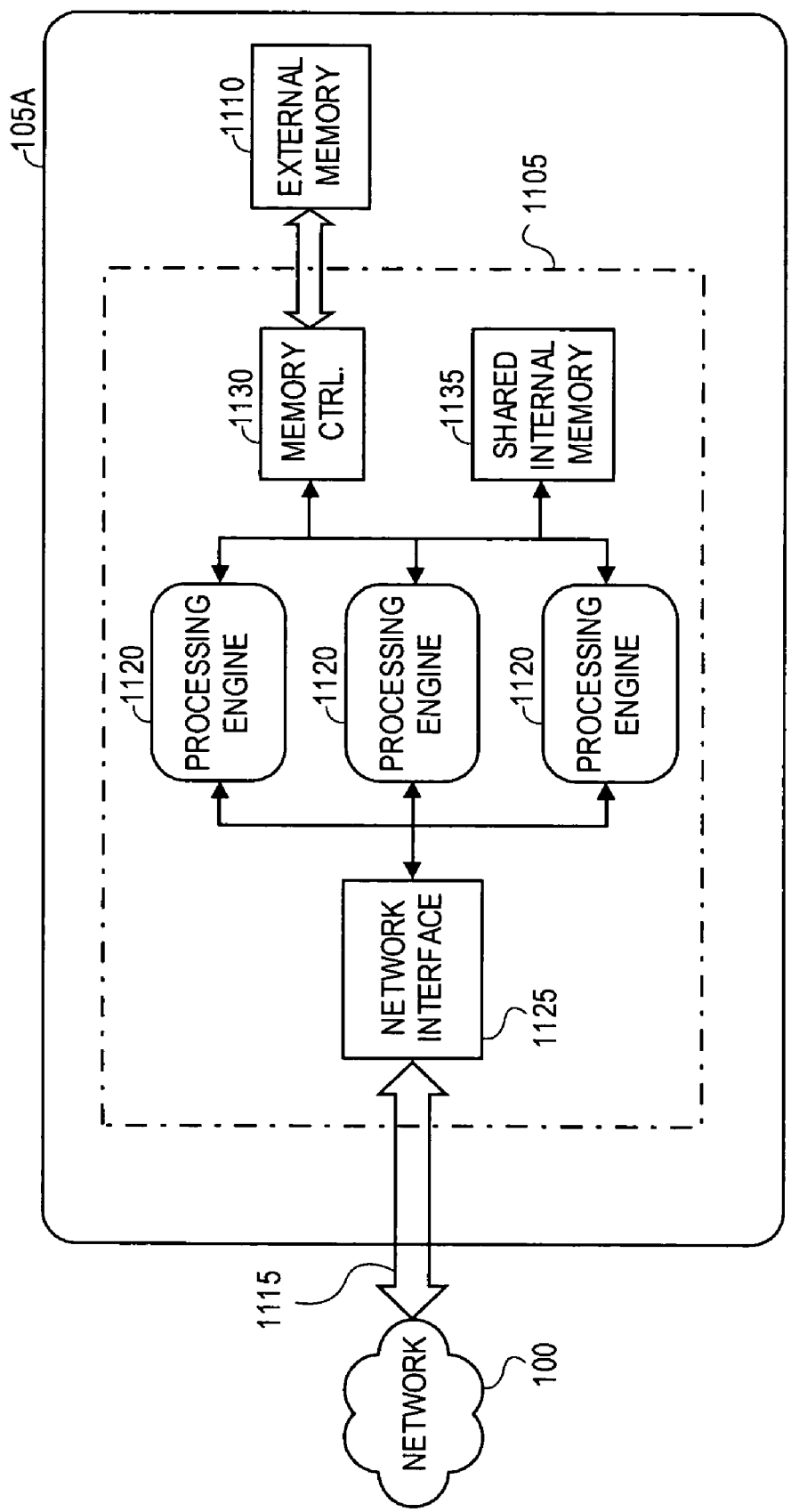
FIG. 11 is a block diagram illustrating a router having a circular queue, in accordance with an embodiment of the present invention.

FIG. 11 illustrates one embodiment of router 105A, in accordance with the teachings of the present invention. The illustrated embodiment of router 105A includes a network processor 1105, external memory 1110, and network link interfaces 1115. The illustrated embodiment of network processor 1105 includes processing engines 1120, a network interface 1125, a memory controller 1130, and shared internal memory 1135.

The elements of router 105A are interconnected as follows. Processing engines 1120 are coupled to network interface 1125 to receive and transmit packet flows F1 and F2 from/to network 100 via network link interfaces 1115. Processing engines 1120 are further coupled to access external memory 1110 via memory controller 1130 and shared internal memory 1135. Memory controller 1130 and shared internal memory 1135 may be coupled to processing engines 1120 via a single bus or multiple buses to minimize delays for external accesses.

Processing engines 1120 may operate in parallel to achieve high data throughput. Typically, to ensure maximum processing power, each of processing engines 1120 process multiple threads and can implement instantaneous context switching between threads. In one embodiment, processing engines 1120 are pipelined and operate on one or more packet flows concurrently. In one embodiment, one or more circular queues 300 are maintained within shared internal memory 1135 for enqueuing and dequeuing queue elements thereto/therefrom. In one embodiment, one or more circular queues 300 are maintained within external memory 1110 for enqueuing and dequeuing queue elements thereto/therefrom.

It should be appreciated that various other elements of router 105A have been excluded from FIG. 11 and this discussion for the purposes of clarity. For example, router 105A may further include a CRC processing unit, a lookup Engine, a control processor for processing tasks that don't need to be processed at full network speed (e.g., Operation, Administration, Maintenance, and Provision ("OAM&P") functions), a data storage device (e.g., hard disk), and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    determining a new enqueue slot of a circular queue having N slots into which a queue element may be enqueued;
    setting a last enqueue slot ("LES") pointer currently designating an old enqueue slot to designate the new enqueue slot after determining the new enqueue slot;
    determining whether the circular queue is full via executing a check comparing relative positions of the new enqueue slot and a current dequeue slot ("CDS"), wherein the check determines whether enqueuing the queue element into the new enqueue slot would result in an overflow condition of the circular queue;
    dropping the queue element, if the ovefflow condition would result from enqueuing the queue element into the new enqueue slot;

resetting the LES pointer to designate the old enqueue slot, if the overflow condition would result from enqueuing the queue element; and enqueuing the queue element into the new enqueue slot, if the circular queue is not full.

2. The method of claim 1, wherein executing the check further comprises determining whether the following relation is true:

$$((CDS^N - LES^N) \bmod N) < M,$$

wherein $CDS_N$ represents CDS mod N, $LES^N$ represents LES mod N, and M represents a number less than N.

3. The method of claim 2 wherein M is equal to or greater than a maximum number of slots that may be enqueued with queue elements during a delay period for updating a dequeue counter.

4. The method of claim 1 wherein determining the new enqueue slot of the circular queue into which the queue element may be enqueued comprises determining the new enqueue slot according to a pre-sort deficit round robin enqueuing scheme.

5. The method of claim 1 wherein each of the N slots of the circular queue can buffer multiple queue elements corresponding to multiple logical queues, wherein the queue element corresponds to a particular one of the multiple logical queues, and wherein the new enqueue slot corresponds to the particular one of the multiple logical queues.

6. The method of claim 5 wherein determining whether the circular queue is full comprises determining whether enqueuing the queue element into the new enqueue slot of the circular queue would result in an overflow condition of the particular one of the multiple logical queues.

7. A method, comprising:
dequeuing a queue element from a current dequeue slot ("CDS") of a circular queue having N slots;
designating a new CDS;
determining whether the circular queue is empty via executing a first check comparing relative positions of the new CDS and a last enqueued slot ("LES"); and
setting the LES to the new CDS, if the circular queue is determined to be empty.

8. The method of claim 7 wherein the CDS is designated by a CDS pointer, wherein designating the new CDS comprises incrementing the CDS pointer to designate the new CDS, wherein the LES is designated by a LES pointer, and wherein setting the LES to the new CDS comprises setting the LES pointer to designate the new CDS, if the circular queue is determined to be empty.

9. The method of claim 7 wherein determining whether the circular queue is empty further comprises executing a second check prior to executing the first check, the second check comprising:
determining whether an enqueue count is equal to a dequeue count.

10. The method of claim 9, further comprising incrementing the dequeue count after dequeuing the queue element from the CDS of the circular queue.

11. The method of claim 7 wherein M is equal to or greater than a maximum number of slots of the circular queue that may be enqueued with queue elements during a delay period for updating a dequeue counter.

12. The method of claim 7 wherein each of the N slots of the circular queue can buffer multiple queue elements corresponding to multiple logical queues, wherein the queue element corresponds to a particular one of the multiple logical queues, and wherein LES corresponds to the particular one of the multiple logical queues.

13. The method of claim 12 wherein determining whether the circular queue is empty via executing the first check comprises determining whether the particular one of the multiple logical queues is empty via executing the first check.

14. A machine-accessible medium that stores instructions that, if executed by a machine, will cause the machine to perform operations comprising:
dequeuing a first queue element from a current dequeue slot ("CDS") of a circular queue having N slots, the CDS designated by a CDS pointer;
incrementing the CDS pointer to designate a new CDS; and
determining whether the circular queue is empty after the incrementing via executing a first check comparing relative positions within the circular queue designated by the CDS pointer and a last enqueued slot ("LES") pointer.

15. The machine-accessible medium of claim 14, further storing instructions that, if executed by the machine, will cause the machine to perform further operations, comprising:
setting the LES pointer currently designating an old enqueue slot of the circular queue to designate a new enqueue slot of the circular queue into which a second queue element may be enqueued;
determining whether enqueuing the second queue element into the new enqueue slot would result in an overflow condition of the circular queue via re-executing the first check after setting the LES pointer to designate the new enqueue slot.

16. The machine-accessible medium of claim 15, further storing instructions that, if executed by the machine, will cause the machine to perform further operations, comprising:
enqueuing the second queue element into the new enqueue slot, if the overflow condition would not result from enqueuing the second queue element into the new enqueue slot;
dropping the second enqueue element, if the overflow condition would result from enqueuing the second queue element into the new enqueue slot; and
resetting the LES pointer to designate the old enqueue slot, if the overflow condition would result from enqueuing the second queue element into the new enqueue slot.

17. The machine-accessible medium of claim 15, further storing instructions that, if executed by the machine, will cause the machine to perform a further operation, comprising determining the new enqueue slot of the circular queue into which the second queue element may be enqueued.

18. The machine-accessible medium of claim 17, wherein determining the new enqueue slot of the circular queue into which the second queue element may be enqueued comprises determining the new enqueue slot according to a per-sort deficit round robin queuing scheme.

19. The machine-accessible medium of claim 14, further storing instructions that, if executed by the machine, will cause the machine to perform further operations, comprising:
setting the LES pointer to designate the current dequeue slot, if the circular queue is determined to be empty.

20. The machine-accessible medium of claim 19 wherein the determining whether the circular queue is empty further comprises executing a second check prior to executing the first check, the second check comprising:
determining whether an enqueue count is equal to a dequeue count, wherein the enqueue count is incremented each time a queue element is enqueued and the dequeue count is incremented each time a queue element is dequeued.

21. The machine-accessible medium of claim 15 wherein executing and re-executing the first check comparing the relative positions within the circular queue designated by the CDS pointer and the LES pointer comprises determining whether the following relation is true:

$$((CDS^N - LES^N) \mod N) < M$$

wherein $CDS^N$ represents CDS mod N, $LES^N$ represents LES mod N, and M represents a number less than N.

22. The machine-accessible medium of claim 18 wherein each of the N slots of the circular queue can buffer multiple queue elements corresponding to multiple logical queues, and wherein the first queue element, the second queue element, and the LES pointer correspond to a particular one of the multiple logical queues.

23. The machine-accessible medium of claim 22 wherein determining whether the circular queue is empty comprises determining whether the particular one of the logical queues is empty and wherein determining whether enqueuing the second queue element would result in an overflow condition of the circular queue comprises determining whether enqueuing the second queue element would result in an overflow condition of the particular one of the logical queues.

* * * * *

UNITED STATES PATENT AND TRADEMARK OFFICE
CERTIFICATE OF CORRECTION

PATENT NO. : 7,499,399 B2
APPLICATION NO. : 10/735146
DATED : March 3, 2009
INVENTOR(S) : Kumar et al.

It is certified that error appears in the above-identified patent and that said Letters Patent is hereby corrected as shown below:

In column 10, at line 65 delete "ovefflow" and insert -- overflow --.

In column 11, at line 11 delete "$CDS_N$," and insert -- $CDS^N$ --.

In column 11, at line 39 after "("LES")," insert -- wherein executing the first check includes determining whether the following relation is true: $((CDS^N - LES^N) \bmod N) < M$, wherein $CDS^N$ represents CDS mod N, $LES^N$ represents LES mod N, and M represents a number less than N --.

In column 12, at line 16 delete "pointer." and insert -- pointer, wherein executing the first check includes determining whether the following relation is true: $((CDS^N - LES^N) \bmod N) < M$, wherein $CDS^N$ represents CDS mod N, $LES^N$ represents LES mod N, and M represents a number less than N. --.

In column 13, at line 9 delete "LESN" and insert -- $LES^N$ --.

Signed and Sealed this

Twenty-eighth Day of September, 2010

David J. Kappos
*Director of the United States Patent and Trademark Office*